United States Patent
Kim

(10) Patent No.: US 9,304,233 B2
(45) Date of Patent: Apr. 5, 2016

(54) LENS MODULE

(71) Applicant: SAMSUNG ELECTRO-MECHANICS CO., LTD., Suwon (KR)

(72) Inventor: Duck-Hun Kim, Suwon (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 14/303,818

(22) Filed: Jun. 13, 2014

(65) Prior Publication Data

US 2014/0293442 A1    Oct. 2, 2014

Related U.S. Application Data

(62) Division of application No. 13/650,781, filed on Oct. 12, 2012, now Pat. No. 9,042,040.

(30) Foreign Application Priority Data

Jul. 27, 2012    (KR) .......................... 10-2012-0082402

(51) Int. Cl.
*G02B 9/00*      (2006.01)
*G02B 3/08*      (2006.01)
*G02B 7/02*      (2006.01)
*G02B 13/00*     (2006.01)

(52) U.S. Cl.
CPC *G02B 3/08* (2013.01); *G02B 7/021* (2013.01); *G02B 13/002* (2013.01); *G02B 13/004* (2013.01)

(58) Field of Classification Search
CPC ....................................................... G02B 3/08
USPC .......................................... 359/741, 754, 796
See application file for complete search history.

(56) References Cited

U.S. PATENT DOCUMENTS

| | | |
|---|---|---|
| 6,473,238 B1 | 10/2002 | Daniell |
| 2005/0237418 A1 | 10/2005 | Sakamoto |
| 2006/0018036 A1 | 1/2006 | Huang |
| 2006/0222300 A1 | 10/2006 | Frenzel et al. |
| 2009/0174954 A1 | 7/2009 | Hara |

(Continued)

FOREIGN PATENT DOCUMENTS

| | | |
|---|---|---|
| CN | 1666130 A | 9/2005 |
| JP | 59-152403 | 8/1984 |
| JP | 59-171914 | 9/1984 |

(Continued)

OTHER PUBLICATIONS

U.S. Final Office Action dated Sep. 12, 2014 in co-pending U.S. Appl. No. 13/650,781.

(Continued)

*Primary Examiner* — William Choi
(74) *Attorney, Agent, or Firm* — NSIP Law

(57) ABSTRACT

A lens module, including: a first lens including a first conical surface based on an optical axis and a first flat surface extending in a vertical direction with respect to the optical axis; and a second lens including a second conical surface based on an optical axis and a second flat surface extending in a vertical direction with respect to the optical axis, wherein the first conical surface and the first flat surface are connected by a first curved surface having a first radius, and the second conical surface and the second flat surface are connected by a second curved surface having a second radius.

1 Claim, 14 Drawing Sheets

(56) References Cited

U.S. PATENT DOCUMENTS

2011/0026144 A1 2/2011 Shyu et al.
2013/0176625 A1\* 7/2013 Chen .............................. 359/619

FOREIGN PATENT DOCUMENTS

| JP | 60-191012 | 12/1985 |
| JP | 62-167209 | 10/1987 |
| JP | 63-204208 | 8/1988 |
| JP | 2001-84926 | 3/2001 |
| JP | 2004-302157 | 10/2004 |
| JP | 2005-062432 | 3/2005 |
| JP | 2006-030894 | 2/2006 |
| JP | 2007-506148 | 3/2007 |
| JP | 2007-163657 | 6/2007 |
| JP | 2008-197282 | 8/2008 |
| JP | 2009-8775 | 1/2009 |
| JP | 2009-80463 | 4/2009 |
| JP | 2009-093071 | 4/2009 |
| JP | 2009-103939 | 5/2009 |
| JP | 2009-139693 | 6/2009 |
| JP | 2009-163120 | 7/2009 |
| JP | 2010-211003 | 9/2010 |
| JP | 2011-221243 | 11/2011 |
| KR | 10-2009-0076308 | 7/2009 |
| WO | WO 2006/064641 | 6/2006 |

OTHER PUBLICATIONS

Japanese Office Action issued on Mar. 3, 2015 in corresponding Japanese Application No. 2014-081630.
Office Action mailed Mar. 20, 2015 in corresponding Chinese Patent Application No. 201210408841.7.
Korean Office Action issued Oct. 28, 2013 in corresponding Korean Patent Application No. 10-2010-0082402.
Japanese Office Action issued Nov. 26, 2013 in corresponding Japanese Application No. 2012-233939.
U.S. Patent Restriction Requirement mailed Mar. 28, 2014 in parent U.S. Appl. No. 13/650,781.
U.S. Patent Office Action mailed May 23, 2014 in parent U.S. Appl. No. 13/650,781.
Korean Notice of Office Action issued Mar. 31, 2014 in corresponding Korean Application No. 10-2013-0165149.
U.S. Appl. No. 13/650,781, filed Oct. 12, 2012, Duck Hun Kim, Samsung Electro-Mechanics Co., Ltd.
U.S. Notice of Allowance mailed Jan. 22, 2015 in co-pending U.S. Appl. No. 13/650,781.
Chinese Office Action issued on Nov. 13, 2015 in counterpart Chinese Application No. 201210408841.7. (18 pages with English translation).

\* cited by examiner

LENS MODULE

CROSS-REFERENCE TO RELATED APPLICATIONS

This application is a U.S. divisional application filed under 37 CFR 1.53(b) claiming priority benefit of U.S. Ser. No. 13/650,781 filed in the United States on Oct. 12, 2012, which claims earlier foreign priority benefit to Korean Patent Application No. 10-2012-0082402 filed with the Korean Intellectual Property Office on Jul. 27, 2012, the disclosures of which are incorporated herein by reference.

BACKGROUND

1. Field

The present invention relates to a lens module, and more particularly, to a lens module in which an optical axis alignment of lenses is easily performed.

2. Description of the Related Art

In accordance with improvements in the performance of portable electronic devices (for example, portable telephones), demand for a small, high-resolution camera unit mounted in a portable electronic device has increased. To this end, a small camera unit may be configured of a lens module including a growing number of lenses.

A lens module including a plurality of lenses may include lenses and a lens barrel receiving the lenses. The lens module has a structure in which lenses are sequentially inserted into the lens barrel and optical axes thereof are aligned.

However, since the lens module structure is a structure in which the optical axes of the lenses are aligned by the lens barrel, there may be a difficulty in that all of the lenses mounted in the lens barrel need to be manufactured to have the same size or may have the same machining error.

In addition, in the above-mentioned structure, each lens is inserted into the lens barrel by a press-fitting method and as a result, it may be difficult to attach the lenses to the lens barrel.

Patent document 1 may be provided as related art associated therewith. Patent Document 1 improves alignment precision between the lenses by forming lenses to have conical surfaces. However, it may be difficult to manufacture the lens module described in Patent Document 1, since identical conical surfaces need to be formed on different lenses.

RELATED ART DOCUMENT (Patent Document 1) Japanese Patent Laid-Open Publication No. 2002-286987 A.

SUMMARY

An aspect of the present invention provides a lens module in which an optical axis alignment of lenses along optical axes is easily performed.

According to an aspect of the present invention, there is provided a lens module, including: a first lens having a protrusion formed on one surface thereof; and a second lens having a groove formed in a surface thereof facing the one surface of the first lens and having the protrusion fitted therein.

A cross section of the protrusion may include a first curved portion having a first radius, and a cross section of the groove may include a second curved portion having a second radius.

The first radius and the second radius may have the same length.

The first radius and the second radius may have different lengths.

A cross section of the protrusion may include a first flat portion extending in a vertical direction with respect to the optical axis and a first curved portion extending from the first flat portion and having a first radius, and a cross section of the groove may include a second flat portion facing the first flat portion and a second curved portion extending from the second flat portion and having a second radius.

The first radius and the second radius may have the same length.

The first radius and the second radius may have different lengths.

A maximum width of the protrusion may be different from that of the groove.

The lens module may further include a lens barrel having a receiving space in which the first lens and the second lens are received.

The receiving space may contact any one of the first lens and the second lens.

According to another aspect of the present invention, there is provided a lens module including: a first lens including a first conical surface based on an optical axis and a first flat surface extending in a vertical direction with respect to the optical axis; and a second lens including a second conical surface based on an optical axis and a second flat surface extending in a vertical direction with respect to the optical axis, wherein the first conical surface and the first flat surface are connected by a first curved surface having a first radius, and the second conical surface and the second flat surface are connected by a second curved surface having a second radius, wherein the first radius and the second radius have the same length.

The first radius and the second radius may have the same length.

The first radius and the second radius may have different lengths.

According to another aspect of the present invention, there is provided a lens module, including: a first lens including a first primary flat surface extending in a vertical direction with respect to an optical axis and a first secondary flat surface having a different height from the first primary flat surface; and a second lens including a second primary flat surface extending in a vertical direction with respect to the optical axis and a second secondary flat surface having a different height from the second primary flat surface, wherein the first primary flat surface and the first secondary flat surface are connected by a first curved surface having a first radius, and the second primary flat surface and the second secondary flat surface are connected by a second curved surface having a second radius.

The first radius and the second radius may have the same length.

The first radius and the second radius may have different lengths.

According to another aspect of the present invention, there is provided a lens module, including: a first lens including a first flat surface extending in a vertical direction with respect to an optical axis, a first vertical surface extending vertically in the optical direction with respect to the first flat surface, and a first curved surface connecting the first flat surface to the first vertical surface and having a first radius; and a second lens including a second flat surface extending in a vertical direction with respect to the optical axis, a second vertical surface extending vertically in the optical direction with respect to the second flat surface, and a second curved surface connecting the second flat surface to the second vertical surface and having a second radius, wherein the first lens and the second lens are aligned by contact between the first curved surface and the second curved surface.

The first radius and the second radius may have the same length.

The first radius and the second radius may have different lengths.

Both of the first curved surface and the second curved surface have a convex shape.

The first curved surface may have a convex shape or a concave shape, and the second curved surface may have a concave shape or a convex shape different from that of the first curved surface.

BRIEF DESCRIPTION OF THE DRAWINGS

The above and other aspects, features and other advantages of the present invention will be more clearly understood from the following detailed description taken in conjunction with the accompanying drawings, in which:

FIGS. 20 and 21 are enlarged views of area E illustrating another type of lens module according to the fifth embodiment of the present invention.

DESCRIPTION OF EMBODIMENTS

Figure 1:
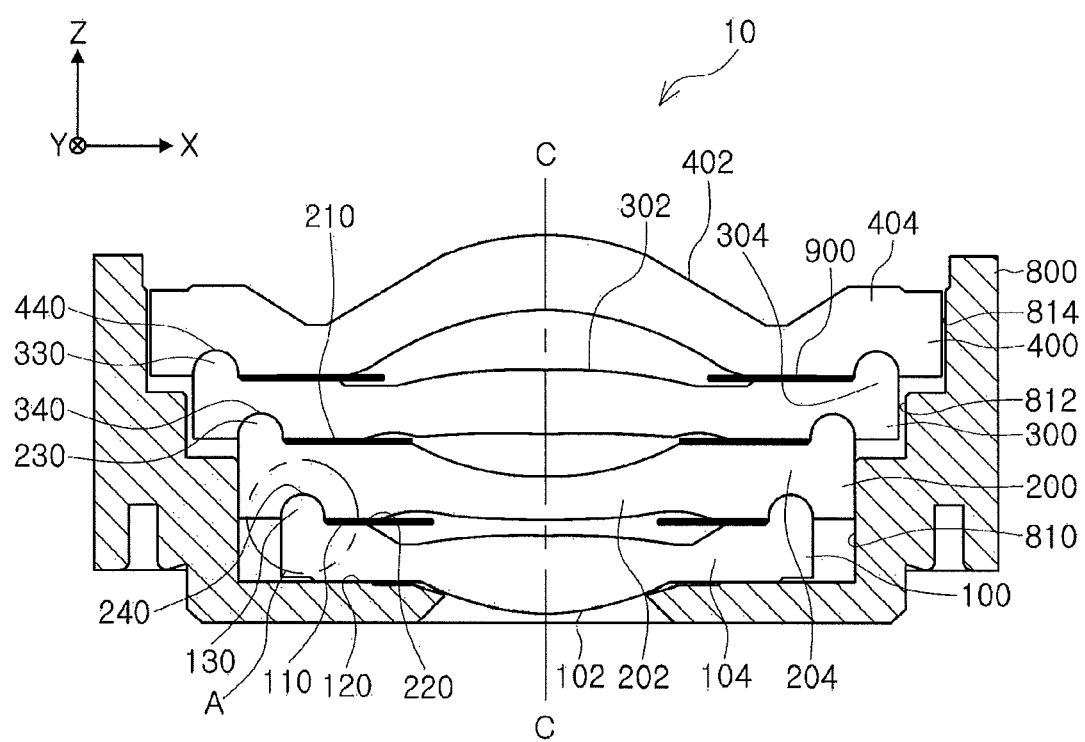
FIG. 1 is a cross-sectional view of a lens module according to a first embodiment of the present invention.

Hereinafter, exemplary embodiments of the present invention will be described in detail based on the accompanying drawings.

The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

Figure 2:
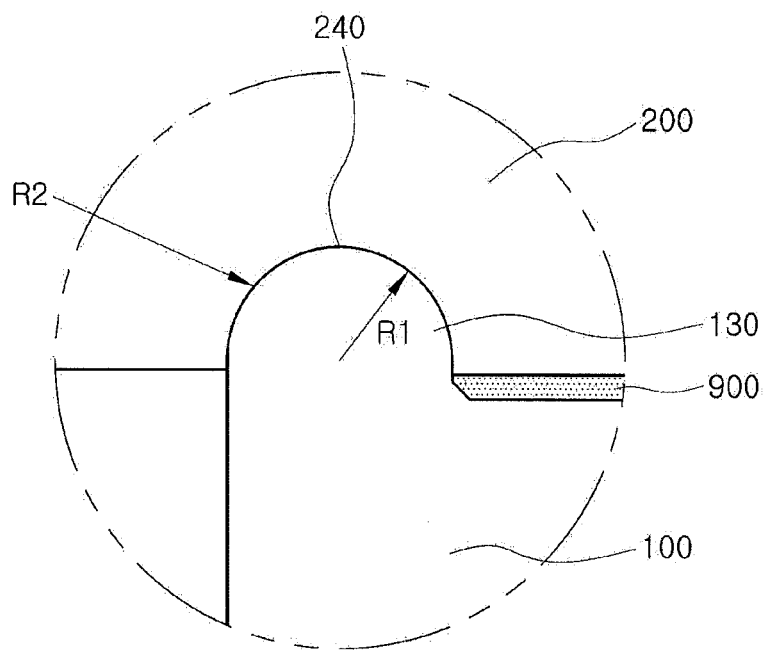
FIG. 2 is an enlarged view of area A shown in FIG. 1.
Figure 3:
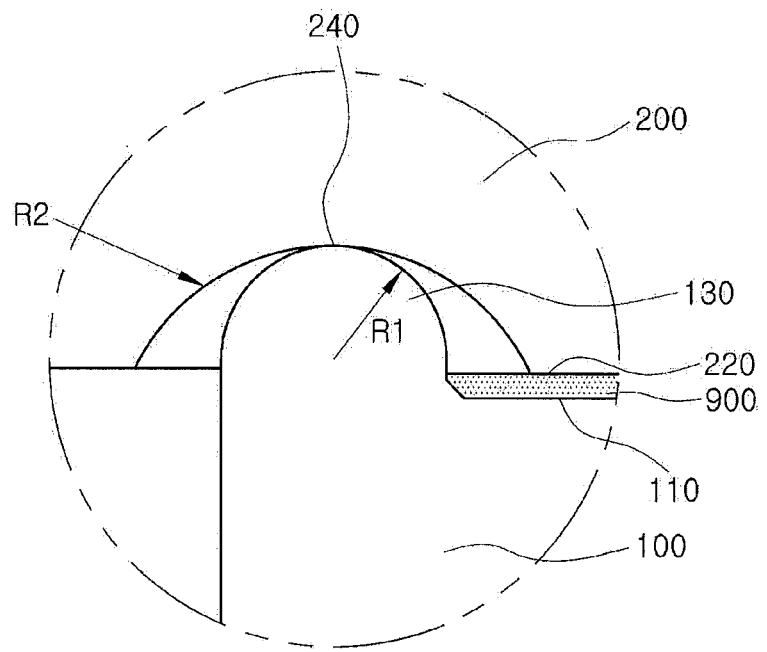
FIG. 3 is an enlarged view of area A illustrating another type of lens module according to the first embodiment of the present invention.
Figure 4:
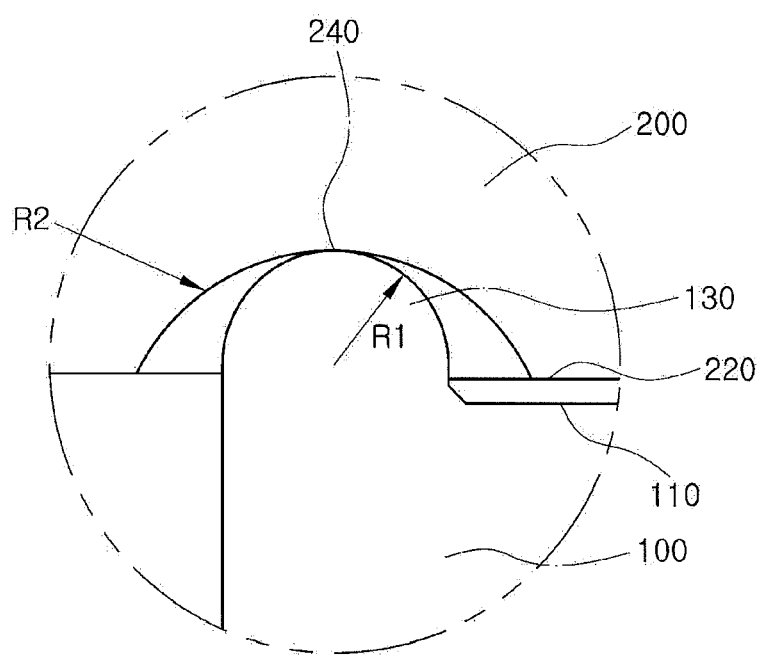
FIG. 4 is an enlarged view of area A illustrating another type of lens module according to the first embodiment of the present invention.
Figure 5:
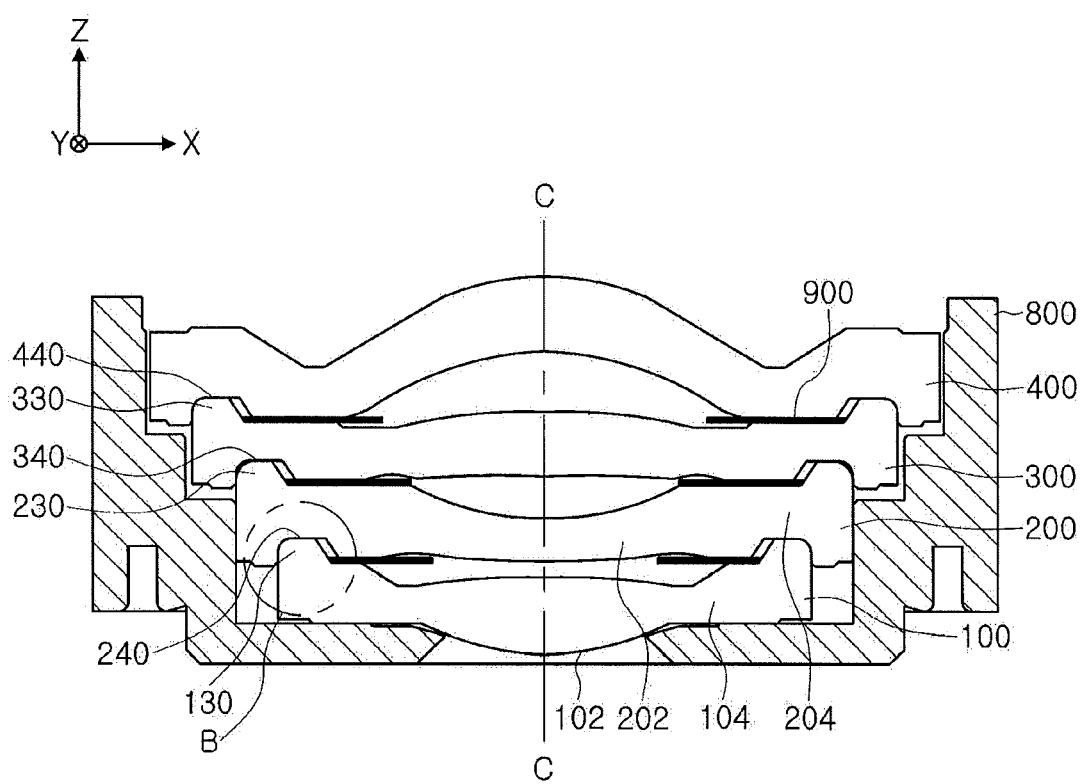
FIG. 5 is a cross-sectional view of a lens module according to a second embodiment of the present invention.
Figure 6:
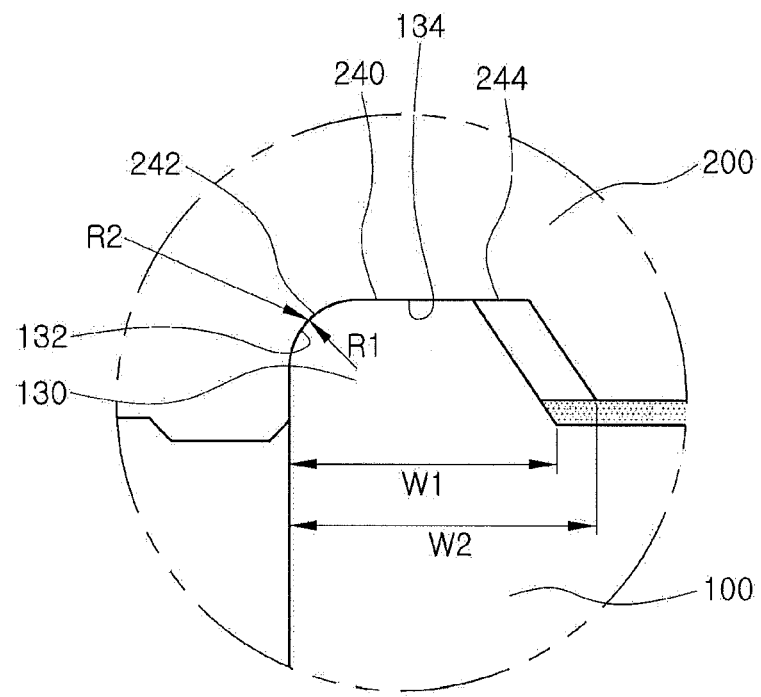
FIG. 6 is an enlarged view of area B shown in FIG. 5.
Figure 7:
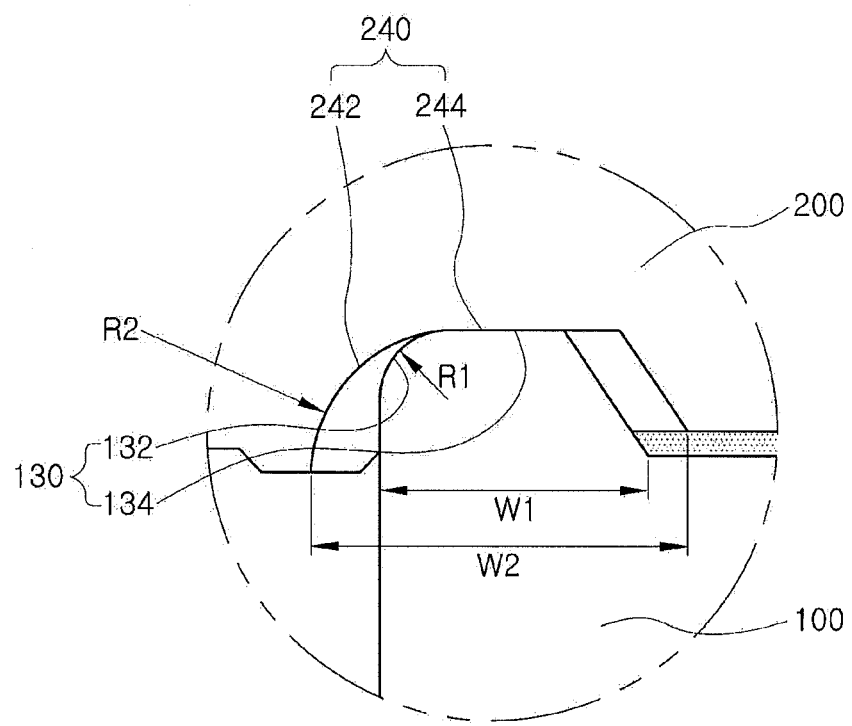
FIG. 7 is an enlarged view of area B illustrating another type of lens module according to the second embodiment of the present invention.
Figure 8:
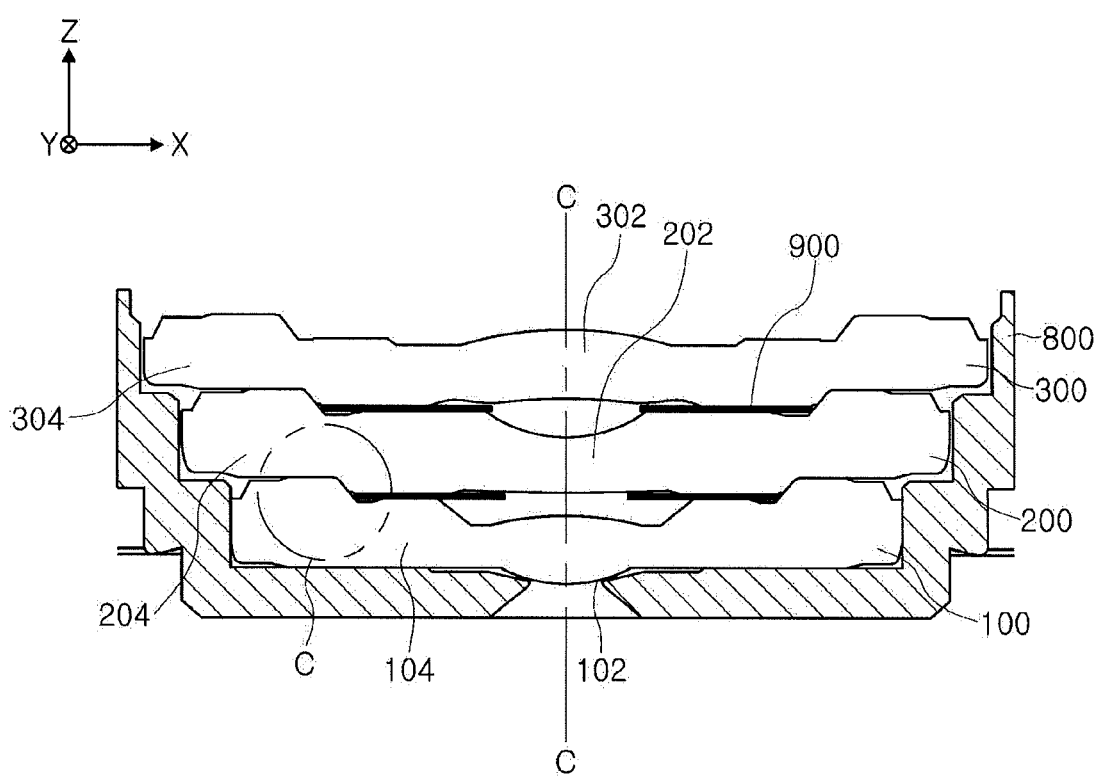
FIG. 8 is a cross-sectional view of a lens module according to a third embodiment of the present invention.
Figure 9:
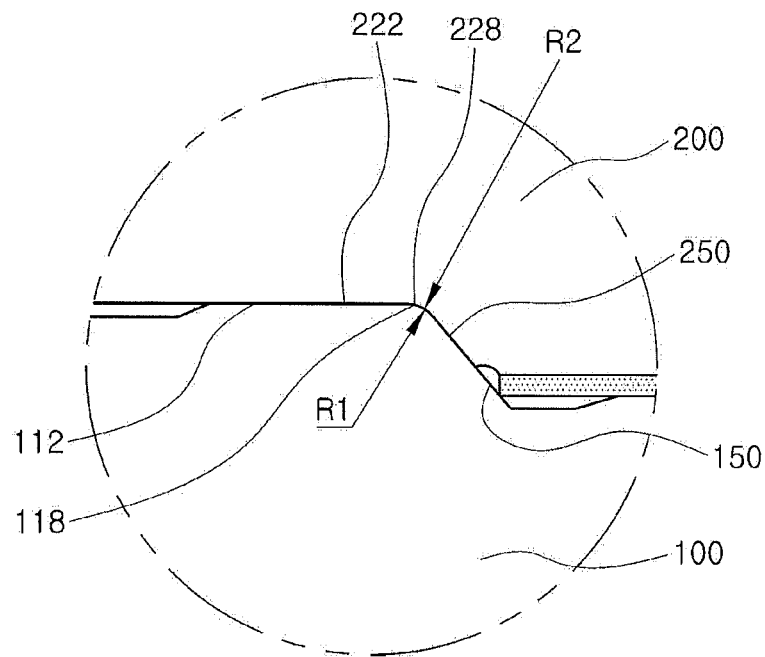
FIG. 9 is an enlarged view of area C shown in FIG. 8.
Figure 10:
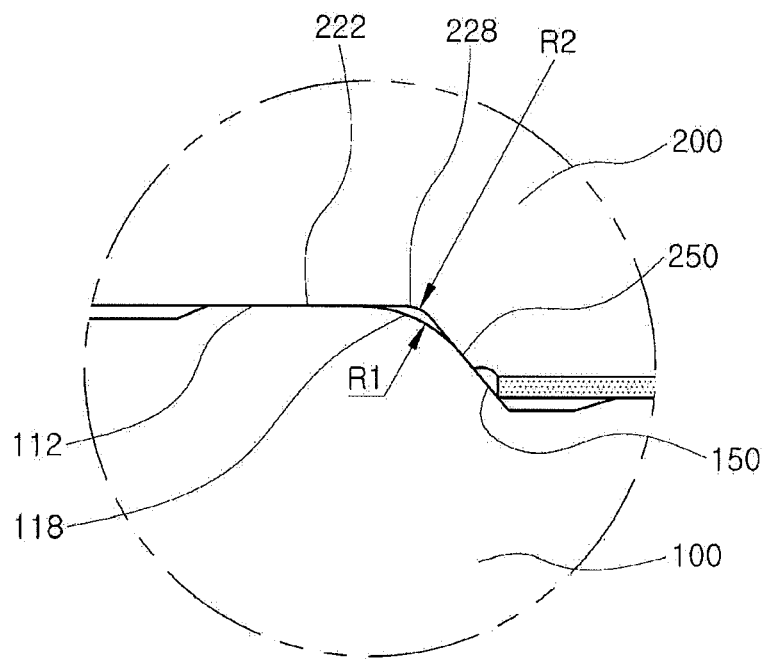
FIG. 10 is an enlarged view of area C illustrating another type of lens module according to a third embodiment of the present invention.
Figure 11:
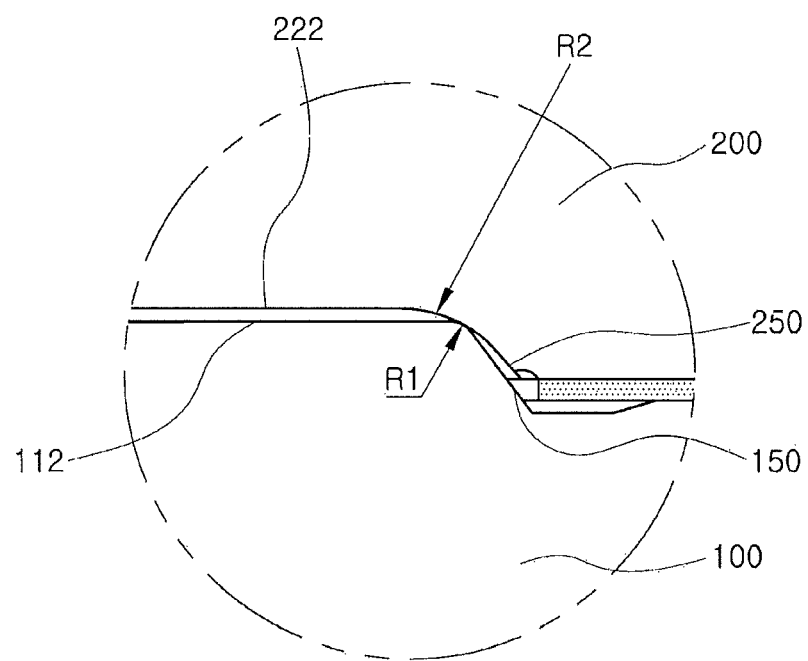
FIG. 11 is an enlarged view of area C illustrating another type of lens module according to the third embodiment of the present invention.
Figure 12:
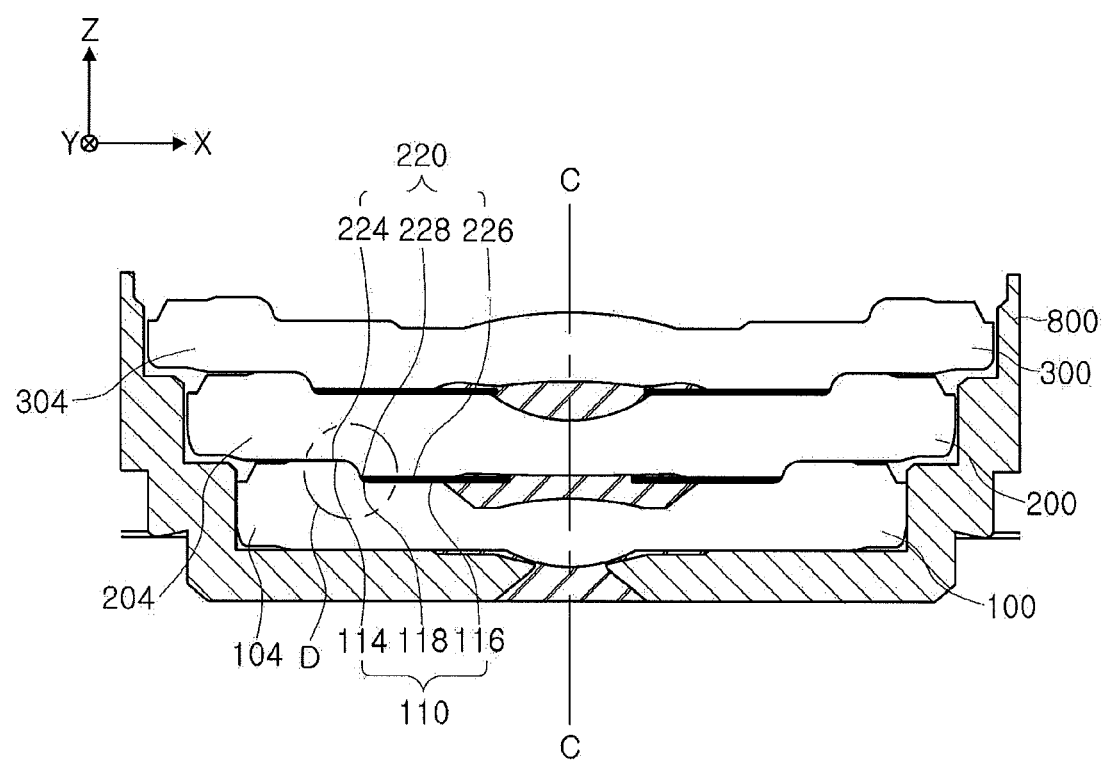
FIG. 12 is a cross-sectional view of a lens module according to a fourth embodiment of the present invention.
Figure 13:
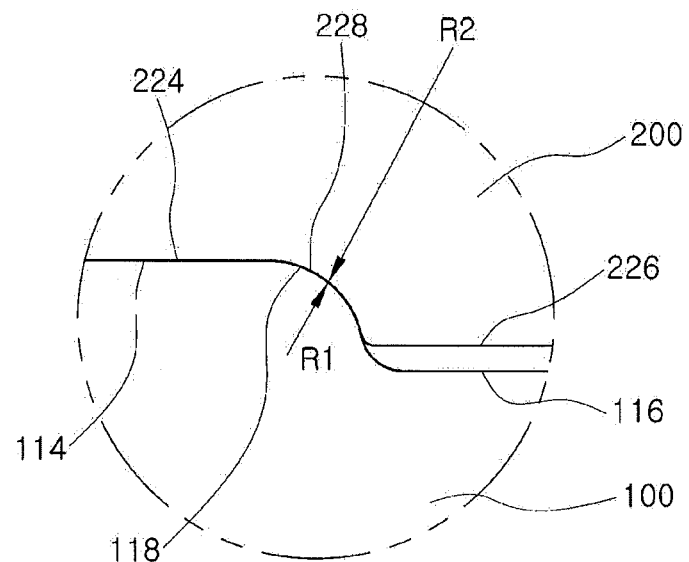
FIG. 13 is an enlarged view of area D shown in FIG. 12.
Figure 14:
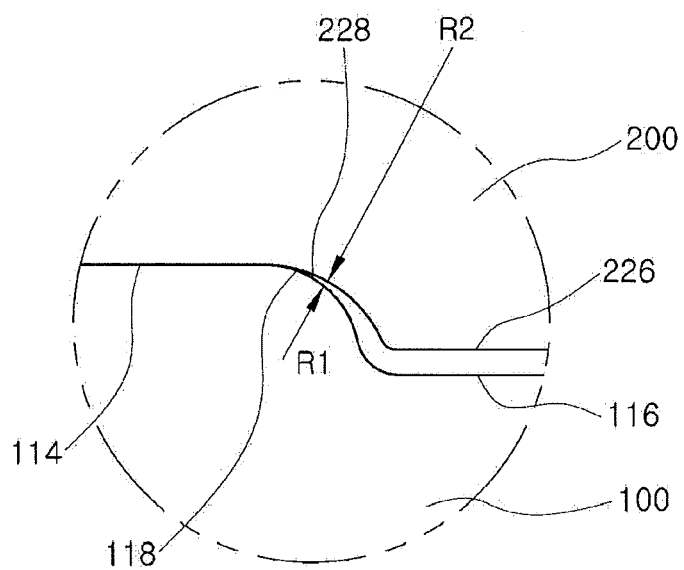
FIG. 14 is an enlarged view of area D illustrating another type of lens module according to the fourth embodiment of the present invention.
Figure 15:
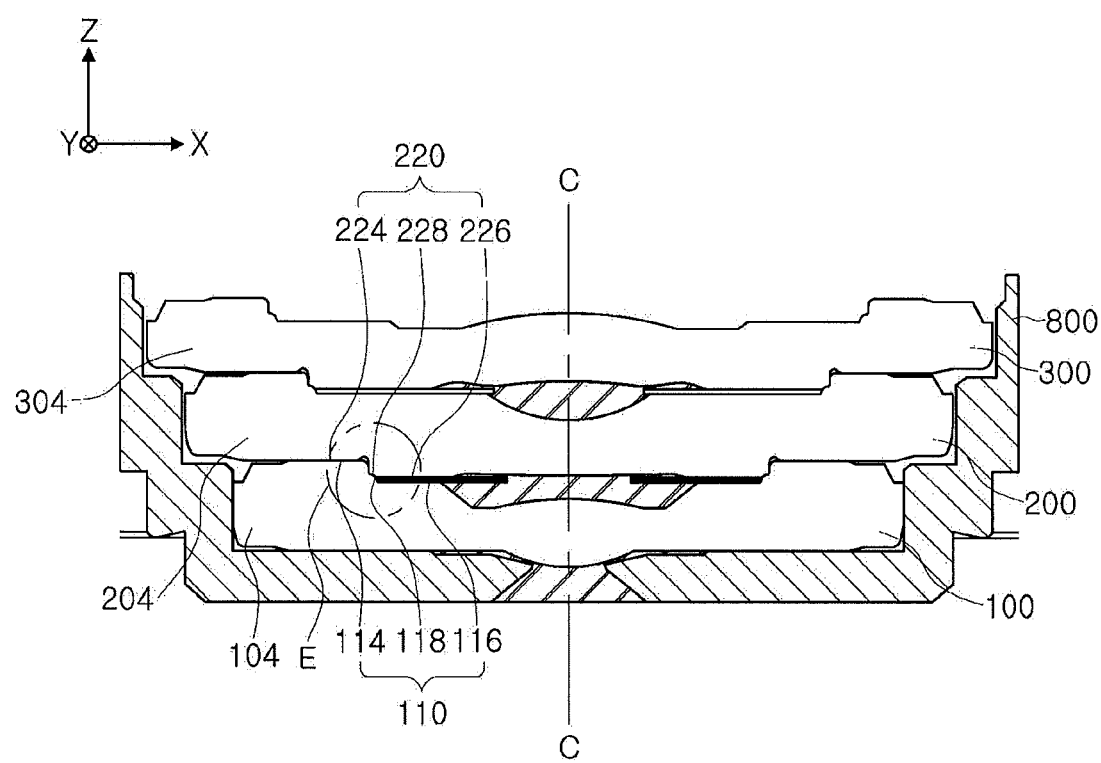
FIG. 15 is a cross-sectional view of a lens module according to a fifth embodiment of the present invention.
Figure 16:
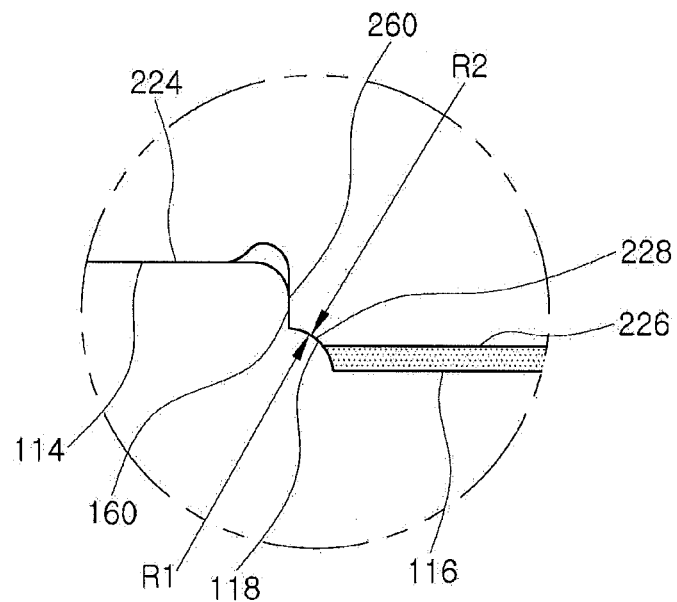
FIG. 16 is an enlarged view of area E shown in FIG. 15.
Figure 17:
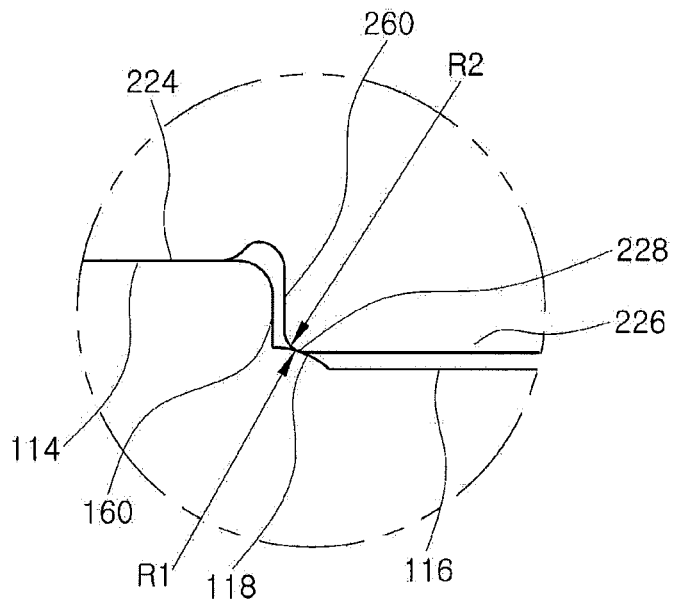
FIG. 17 is an enlarged view of area E illustrating another type of lens module according to the fifth embodiment of the present invention.
Figure 18:
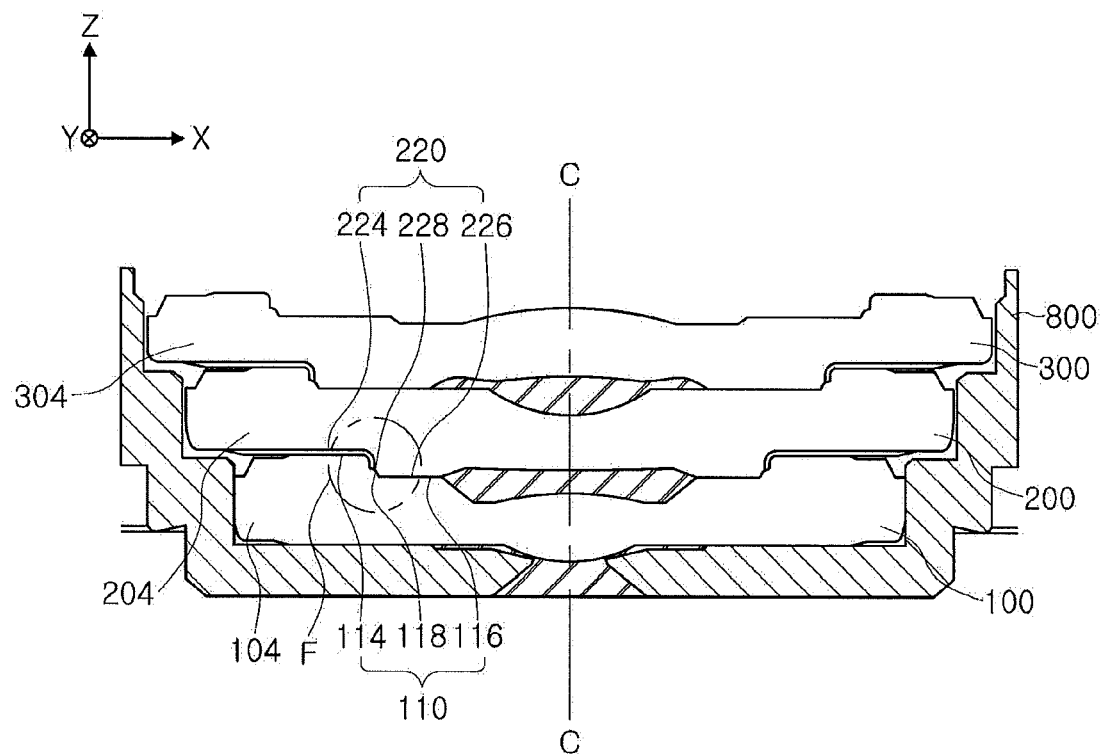
FIG. 18 is a cross-sectional view of a lens module according to a sixth embodiment of the present invention.
Figure 19:
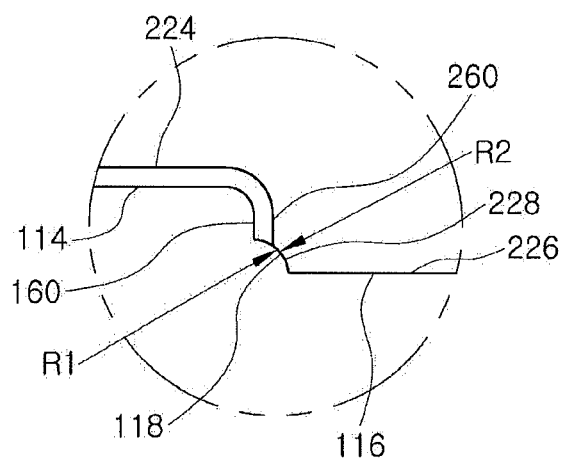
FIG. 19 is an enlarged view of area F shown in FIG. 18.
Figure 21:
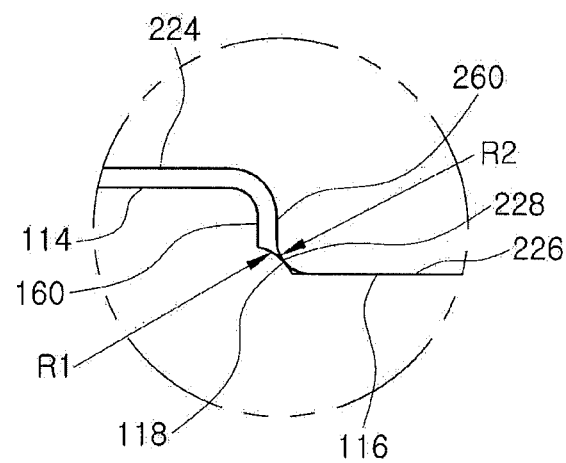

FIG. 1 is a cross-sectional view of a lens module according to a first embodiment of the present invention, FIG. 2 is an enlarged view of area A shown in FIG. 1, FIG. 3 is an enlarged view of area A illustrating another type of lens module according to the first embodiment of the present invention, FIG. 4 is an enlarged view of area A illustrating another type of lens module according to the first embodiment of the present invention, FIG. 5 is a cross-sectional view of a lens module according to a second embodiment of the present invention, FIG. 6 is an enlarged view of area B shown in FIG. 5, FIG. 7 is an enlarged view of area B illustrating another type of lens module according to the second embodiment of the present invention, FIG. 8 is a cross-sectional view of a lens module according to a third embodiment of the present invention, FIG. 9 is an enlarged view of area C shown in FIG. 8, FIG. 10 is an enlarged view of area C illustrating another type of lens module according to a third embodiment of the present invention, FIG. 11 is an enlarged view of area C illustrating another type of lens module according to the third embodiment of the present invention, FIG. 12 is a cross-sectional view of a lens module according to a fourth embodiment of the present invention, FIG. 13 is an enlarged view of area D shown in FIG. 12, FIG. 14 is an enlarged view of area D illustrating another type of lens module according to the fourth embodiment of the present invention, FIG. 15 is a cross-sectional view of a lens module according to a fifth embodiment of the present invention, FIG. 16 is an enlarged view of area E shown in FIG. 15, FIG. 17 is an enlarged view of area E illustrating another type of lens module according to the fifth embodiment of the present invention, FIG. 18 is a cross-sectional view of a lens module according to a sixth embodiment of the present invention, FIG. 19 is an enlarged view of area F shown in FIG. 18, and FIGS. 20 and 21 are enlarged views of area E illustrating another type of lens module according to the fifth embodiment of the present invention.

The lens module according to the first embodiment of the present invention will be described with reference to FIGS. 1 through 4.

A lens module 10 according to the first embodiment of the present invention may include a first lens 100, a second lens 200, a third lens 300, a fourth lens 400, and a lens barrel 800. Further, the lens module 10 may selectively further include a light shielding member 900. In addition, the lens module 10 may further include a fifth lens or an additional lens according to a resolution to be implemented.

The first lens 100 may be formed of glass, thermosetting resin, thermoplastic resin, or plastic materials. The first lens 100 may generally have positive refractive power or negative refractive power. The first lens 100 may be disposed in the inside of the lens barrel 800 and may be a lens closest to an object in the lens barrel 800.

The first lens 100 may include a lens function part 102 and a flange part 104. The lens function part 102 may substantially refract incident light reflected from the object. To this end, the lens function part 102 may have a concave shape, a convex shape, or a meniscus shape. The flange part 104 may be disposed at an edge of the lens function part 102. The flange part 104 may be a part contacting the lens barrel 800 or another lens. Further, the flange part 104 may be coated with a light shielding material so as to prevent unnecessary light from being transmitted through the flange part 104.

The first lens 100 may have an area smaller than that of a receiving space 810 of the lens barrel 800. That is, a transverse section area of the first lens 100 may be smaller than that of the receiving space 810. Therefore, the first lens 100 mounted in the lens barrel 800 may not contact an inner surface of the lens barrel 800.

A protrusion 130 may be formed on a first surface 110 (a top surface based on FIG. 1) of the first lens 100. Here, the protrusion 130 may have a semicircular cross sectional shape having a first radius R1. However, the protrusion 130 is not limited to having the semicircular cross sectional shape. The protrusion 130 may have a ring shape, centered on an optical axis C-C. However, the shape of the protrusion 130 is not limited thereto and may be a semispherical shape, if necessary. Further, the protrusion 130 may have an aspherical surface.

The second surface 120 (a bottom surface based on FIG. 1) of the first lens 100 may contact an inner surface of the lens barrel 800. The second surface 120 of the first lens 100 surface-contacts the inner surface of the lens barrel 800 to stably maintain the position of the first lens 100.

The second lens 200 may be formed of glass, thermosetting resin, thermoplastic resin, or plastic materials. The second lens 200 may generally have positive refractive power or negative refractive power. In addition, the refractive power of the second lens 200 may be different from that of the first lens 100. The second lens 200 may be disposed on the inside of the lens barrel 800. Describing in detail, the second lens 200 may be disposed above the first lens 100 (a vertical direction based on FIG. 1).

The second lens 200 may include a lens function part 202 and a flange part 204. The lens function part 202 may substantially refract incident light reflected from the object. To this end, the lens function part 202 may have a concave shape, a convex shape, or a meniscus shape. The flange part 204 may be disposed at an edge of the lens function part 202. The flange part 204 may be a part contacting the lens barrel 800 or another lens. Further, the flange part 204 may be coated with a light shielding material so as to prevent unnecessary light from being transmitted through the flange part 204.

The second lens 200 may have the same area as that of the receiving space 810 of the lens barrel 800. That is, a transverse section area of the second lens 200 may be equal to that of the receiving space 810. Therefore, the second lens 200 mounted in the lens barrel 800 may contact the inner surface of the lens barrel 800.

A protrusion 230 may be formed on a first surface 210 (a top surface based on FIG. 1) of the second lens 200. Here, a cross sectional shape of the protrusion 230 may be the same as that of the protrusion 130 of the first lens 100. The protrusion 230 of the second lens 200 may be fitted into a groove 340 of the third lens 300.

A groove 240 may be formed in the second surface 220 of the second lens 200. Here, the groove 240 may have a cross sectional shape able to receive the protrusion 130. The groove 240 may have a semicircular cross sectional shape (intaglio) having a second radius R2. Meanwhile, the groove 240 may have a ring shape centered on an optical axis C-C. However, the groove 240 is not limited thereto and may have a concave semispherical shape, if necessary.

The second radius R2 may be the same length as the first radius R1 as shown in FIG. 2. In this case, the alignment of the optical axes of the first lens 100 and the second lens 200 may be easily performed by the joining of the protrusion 130 and the groove 240.

However, the second radius R2 may be different from the first radius R1 as shown in FIGS. 3 and 4, if necessary. Even in this case, the protrusion 130 tends to move to a central portion of the groove 240 along a curved portion of the groove 240 and therefore, the alignment of the optical axes of the first lens 100 and the second lens 200 may be easily performed by the joining of the protrusion 130 and the groove 240.

Meanwhile, the flange part 104 of the first lens 100 and the flange part 204 of the second lens 200 may contact each other via the light shielding member 900 as shown in FIG. 3. However, as shown in FIG. 4, the flange part 104 of the first lens 100 may not contact the flange part 204 of the second lens 200, if necessary.

Like the forgoing lens, the third lens 300 and the fourth lens 400 may be formed of glass, thermosetting resin, thermoplastic resin, or plastic materials. Further, the third lens 300 and the fourth lens 400 may have positive refractive power or negative refractive power. Here, the refractive power of the third lens 300 may be different from that of the fourth lens 400.

The third lens 300 and the fourth lens 400 may have an area smaller than that of a receiving space 812 and 814 of the lens barrel 800. That is, the transverse section area of the third lens 300 may be smaller than that of a receiving space 812 and the transverse section area of the fourth lens 400 may be smaller than that of a receiving space 814. Therefore, the third lens 300 and the fourth lens 400, mounted in the lens barrel 800, may not contact the inner surface of the lens barrel 800.

The third lens 300 and the fourth lens 400 may include lens function parts 302 and 402 and flange parts 304 and 404. The lens function parts 302 and 402 may have a concave shape, a convex shape, or a meniscus shape.

A protrusion 330 and the groove 340 may be formed on the flange part 304 of the third lens 300 and a groove 440 may be formed on the flange part 404 of the fourth lens 400. The protrusion 330 of the third lens 300 may be fitted into the groove 440 of the fourth lens 400 and the protrusion 230 of the second lens 200 may be fitted into the groove 340 of the third lens 300.

For reference, the protrusion 330 of the third lens 300 is the same as the protrusion 130 of the above-mentioned first lens 100 and the shape of the groove 340 of the third lens 300 and the groove 440 of the fourth lens 400 is the same as that of the groove 240 of the above-mentioned second lens 200 and therefore, a detailed description thereof will be omitted.

The lens barrel 800 may have the receiving spaces 810, 812, and 814 that can receive the plurality of lenses 100, 200, 300, and 400. The receiving spaces 810, 812, and 814 may have cross sectional areas that are different according to the positions of the lenses 100, 200, 300, and 400 so as to appropriately receive lenses having different sizes. For example, the cross sectional area of the receiving space 814 in which the fourth lens 400 is received may be larger than that of the receiving space 810 in which the first lens 100 and the second lens 200 are received. However, when the sizes of the lenses received in the lens barrel 800 are the same, all of the cross sectional areas of the receiving spaces 810, 812, and 814 may be the same.

The light shielding member 900 may be disposed between the lenses. In addition, the light shielding member 900 may be disposed between the first lens 100 and the second lens 200, between the second lens 200 and the third lens 300, and between the third lens 300 and the fourth lens 400, respectively. However, the light shielding member 900 may be partially omitted, if necessary.

Further, the flange parts 104, 204, 304, and 404 of each lens 100, 200, 300, and 400 may be provided with an airway. The airway may effectively reduce or remove turgor pressure generated at the time of vertically stacking the lenses.

The lens module 10 configured as described above has the following advantages.

First, the optical axis alignment of the lenses may be easily performed.

According to the embodiment of the present invention, the joining of the lenses may be performed by the joining of the protrusion and the groove. Here, the protrusion and the groove have predetermined radii and therefore, may point-contact or line-contact each other in a specific position at all times. Therefore, the lenses may be constantly joined to each other at a predetermined position by the joining of the protrusion and the groove and therefore, the optical axes of the lenses may be naturally aligned.

Second, the lenses may be easily manufactured.

In the lens module 10 according to the embodiment of the present invention, as shown in FIG. 3, the optical axes of the lenses may be aligned even when the radii of the protrusion and the groove are not necessarily identical. Therefore, according to the embodiment of the present invention, the protrusion and the groove that are an aligning means of the lenses do not require precision machining and therefore, the lenses may be easily manufactured.

Third, the lens barrel and the lenses may be easily joined.

The lens module 10 according to the embodiment of the present invention may have a structure in which only the specific lens (the second lens 200 in the present embodiment) among the plurality of lenses 100, 200, 300, and 400 is joined to the inner surface of the lens barrel 800. According to the structure, the positions of the remaining lenses are aligned by the specific lens joined to the lens barrel 800 and therefore, the optical axis alignment of the lenses is easily performed. Further, according to the structure, only the specific lens among the plurality of lenses contacts the lens barrel 800 and therefore, the plurality of lenses may be easily fitted into the lens barrel 800. Therefore, in the lens module 10 according to the embodiment of the present invention, the lens barrel and the lenses may be easily joined.

Next, other embodiments of the present invention will be described. For reference, the same components as those of the first embodiment are denoted by the same reference numerals in the description of other embodiments and therefore, a detailed description thereof will be omitted.

The lens module according to the second embodiment of the present invention will be described with reference to FIGS. 5 through 7.

The lens module 10 according to the second embodiment of the present invention may be differentiated from that according to the first embodiment of the present invention in terms of the shape of the protrusion 130 and the groove 240.

The protrusion 130 may be protruded toward the second lens 200 from the flange part 104 of the first lens 100. The protrusion 130 may include a first curved portion 132 and a first flat portion 134. The first curved portion 132 may have the first radius R1 and the first flat portion 134 may be a portion vertical with respect to the optical axis. The protrusion 130 may have a predetermined width W1. Here, the width W1 shown in the drawings may be a maximum width of the protrusion 130.

The groove 240 may be formed in the flange part 204 of the second lens 200 and may receive the protrusion 130 of the first lens 100. The groove 240 may have a predetermined width W2. Here, the width W2 shown in the drawings may be a maximum width of the groove 240 and may be larger than the width W1 of the protrusion 130. In this case, since the protrusion 130 of the first lens 100 may be easily inserted into the groove 240 of the second lens 200, the first lens 100 and the second lens 200 may be easily joined.

The groove 240 may include a second curved portion 242 and a second flat portion 244. The second curved portion 242 may have a second radius R2. The second radius R2 may be equal to or larger than the first radius R1 (see FIGS. 6 and 7). The second curved portion 242 may contact the first curved portion 132 in the state in which the first lens 100 and the second lens 200 are joined. The second flat portion 244 may be a portion facing the first flat portion 134 and may surface-contact the first flat portion 134 in the state in which the first lens 100 and the second lens 200 are joined.

In the lens module 10, configured as described above, the groove 240 of the second lens 200 may be larger than the protrusion 130 of the first lens 100 and therefore, the first lens 100 and the second lens 200 may be easily joined.

Further, the first curved portion 132 and the first flat portion 134 of the protrusion 130 respectively contact the second curved portion 242 and the second flat portion 244 of the groove 240 in the state in which the first lens 100 and the second lens 200 are joined, such that the vertical alignment and the lateral alignment of the lenses 100 and 200 may be simultaneously performed.

Meanwhile, although only the joining structure of the first lens 100 and the second lens 200 are described above, the joining structure of the second lens 200 and the third lens 300 and the joining structure of the third lens 300 and the fourth lens 400 may be the same as the joining structure of the first lens 100 and the second lens 200.

The lens module according to the third embodiment of the present invention will be described with reference to FIGS. 8 through 11.

The lens module 10 according to the third embodiment may be differentiated from the foregoing embodiments in terms of the shape of the flange part. In other words, the lenses according to the present embodiment may not include the protrusion and the groove.

The first lens 100 may include a first flat surface 112, a first conical surface 150, and a first curved surface 118. The first flat surface 112 may be formed on the flange part 104 and may be a plane vertical with respect to the optical axis. The first conical surface 150 may be formed to be adjacent to the first flat surface 112. The first conical surface 150 may be a portion of a cone in which any one point located on the optical axis C-C is set as an apex and may have a predetermined slope to the first flat surface 112. The first curved surface 118 connects the first flat surface 112 with the first conical surface 150 and may have the first radius R1.

The second lens 200 may include a second flat surface 222, a second conical surface 250, and a second curved surface 228. The second flat surface 222 may be formed on the flange part 204 and may be a plane vertical with respect to the optical axis. The second conical surface 250 may be formed to be adjacent to the second flat surface 222. The second conical surface 250 may be a portion of a cone in which any one point located on the optical axis C-C is set as an apex and may have a predetermined slope to the second flat surface 222. Here, a virtual cone formed by the second conical surface 250 and a virtual cone formed by the first conical surface 150 may have the same shape. The second curved surface 228 connects the second flat surface 222 with the second conical surface 250 and may have the second radius R2. The second radius R2 may be the same as the first radius R1 as shown in FIG. 9. However, the second radius R2 may be different from the first radius R1 as shown in FIGS. 10 and 11, if necessary. Here, in connection with the former, the optical axes of the first lens 100 and the second lens 200 may be aligned by the surface contact between the conical surfaces 150 and 250. Unlike this, in connection with the latter, the optical axes of the first lens 100 and the second lens 200 may be aligned by the contact between the first curved surface 118 and the second curved surface 228.

Meanwhile, although only the joining structure of the first lens 100 and the second lens 200 is described above, the joining structure of the second lens 200 and the third lens 300 and the joining structure of the third lens 300 and the fourth lens 400 may be the same as the joining structure of the first lens 100 and the second lens 200.

The lens module according to the fourth embodiment of the present invention will be described with reference to FIGS. 12 through 14.

The lens module 10 according to the fourth embodiment may be differentiated from the foregoing embodiments in terms of the shape of the flange part.

The first surface 110 of the first lens 100 may be provided with a first primary flat surface 114 and a first secondary flat surface 116. The first primary flat surface 114 and the first secondary flat surface 116 may have different heights. For example, the first primary flat surface 114 may be higher than the first secondary flat surface 116 (based on FIG. 12). The first primary flat surface 114 and the first secondary flat surface 116 may be connected by the first curved surface 118 or a plurality of curved surfaces including the first curved surface 118. The first curved surface 118 may have the first radius R1.

The second surface 220 of the second lens 200 may be provided with a second primary flat surface 224 and a second secondary flat surface 226. The second primary flat surface 224 and the second secondary flat surface 226 may have different heights. For example, the second primary flat surface 224 may be higher than the second secondary flat surface 226 (based on FIG. 12). Here, a height difference between the second primary flat surface 224 and the second secondary flat surface 226 may be equal to or different from a height difference between the first primary flat surface 114 and the first secondary flat surface 116. The second primary flat surface 224 and the second secondary flat surface 226 may be connected by the second curved surface 228 or a plurality of curved surfaces including the second curved surface 228. The second curved surface 228 may have the second radius R2. Here, the second radius R2 may be equal to the first radius R1 as shown in FIG. 13 and may be larger than the first radius R1 as shown in FIG. 14.

In the lens module 10 configured as described above, the conical surface that is not relatively easily machined needs not to be formed on the flange part 204 and therefore, the lens may be easily manufactured.

Meanwhile, although only the joining structure of the first lens 100 and the second lens 200 is described above, the joining structure of the second lens 200 and the third lens 300 and the joining structure of the third lens 300 and the fourth lens 400 may be the same as the joining structure of the first lens 100 and the second lens 200.

The lens module according to the fifth embodiment of the present invention will be described with reference to FIGS. 15 through 17.

The lens module 10 according to the fifth embodiment may be differentiated from the foregoing embodiments in terms of the shape of the flange part.

The first surface 110 of the first lens 100 may be provided with the first primary flat surface 114 and the first secondary flat surface 116. The first primary flat surface 114 and the first secondary flat surface 116 may be connected by a first vertical surface 160 parallel with the optical axis. Further, the first curved surface 118 may be formed between the first vertical surface 160 and the first secondary flat surface 116. The first curved surface 118 may have the first radius R1. The first curved surface 118 may have a convex shape as shown in FIG. 16. However, the first curved surface 118 may have a concave shape, if necessary.

The second surface 220 of the second lens 200 may be provided with the second primary flat surface 224 and the second secondary flat surface 226. The second primary flat surface 224 and the second secondary flat surface 226 may be connected by a second vertical surface 260 parallel with the optical axis. Further, the second curved surface 228 may be formed between the second vertical surface 260 and the second secondary flat surface 226. The second curved surface 228 may have the second radius R2. The second curved surface 228 may have a concave shape as shown in FIGS. 19 and 20. However, the second curved surface 228 may also have a convex shape as shown in FIG. 21.

Meanwhile, the first radius R1 of the first curved surface 118 may be equal to the second radius R2 of the second curved surface 228, as shown in FIG. 16. However, the first radius R1 of the first curved surface 118 may be different from the second radius R2 of the second curved surface 228 as shown in FIG. 17, if necessary.

The first lens 100 and the second lens 200 may be aligned by being vertically (a Z-axis direction based on FIG. 15) joined to each other. In this state, the first primary flat surface 114 and the second primary flat surface 224 may contact each other, but the first secondary flat surface 116 and the second secondary flat surface 226 may not contact each other.

The optical axes of the first and second lenses 100 and 200 may coincide with each other by the contact between the first vertical surface 160 and the second vertical surface 260 or the contact between the first curved surface 118 and the second curved surface 228.

However, the optical axes of the first and second lenses 100 and 200 may coincide with each other by the contact between the first curved surface 118 and the second curved surface 228 even when the first vertical surface 160 and the second vertical surface 260 do not contact each other as shown in FIG. 17.

In the lens module 10 configured as described above, the conical surface that is not relatively easily machined needs not to be formed on the flange part 204 and therefore, the lens may be easily manufactured. In addition, the joining position between the first lens 100 and the second lens 200 is naturally aligned by the contact between the first curved surface 118 and the second curved surface 228 and therefore, a distance between the first and second lenses 100 and 200 may be constantly maintained.

Further, in the lens module 10 according to the embodiment of the present invention, the alignment of the optical axis between the first and second lenses 100 and 200 is performed by the first curved surface 118 and the second curved surface 228 even when the first vertical surface 160 and the second vertical surface 260 do not contact each other by the machining error (see FIG. 17), such that a lens module having a high resolution may be easily manufactured.

Meanwhile, although only the joining structure of the first lens 100 and the second lens 200 is described above, the joining structure of the second lens 200 and the third lens 300 and the joining structure of the third lens 300 and the fourth lens 400 may be the same as the joining structure of the first lens 100 and the second lens 200.

The lens module according to the sixth embodiment of the present invention will be described with reference to FIGS. 18 through 21.

The lens module 10 according to the sixth embodiment may be differentiated from the foregoing embodiments in terms of the shape of the flange part.

The first surface 110 of the first lens 100 may be provided with the first primary flat surface 114 and the first secondary flat surface 116. The first primary flat surface 114 and the first secondary flat surface 116 may be connected by the first vertical surface 160 parallel with the optical axis. Further, the first curved surface 118 may be formed between the first vertical surface 160 and the first secondary flat surface 116. The first curved surface 118 may have the first radius R1. The first curved surface 118 may have a convex shape as shown in FIG. 16. However, the first curved surface 118 may have a concave shape, if necessary.

The second surface 220 of the second lens 200 may be provided with the second primary flat surface 224 and the second secondary flat surface 226. The second primary flat surface 224 and the second secondary flat surface 226 may be connected by the second vertical surface 260 parallel with the optical axis. Further, the second curved surface 228 may be formed between the second vertical surface 260 and the second secondary flat surface 226. The second curved surface 228 may have the second radius R2. The second curved surface 228 may have a concave shape as shown in FIG. 16. However, the second curved surface 228 may also have a convex shape as shown in FIG. 17.

Meanwhile, the first radius R1 of the first curved surface 118 may be equal to the second radius R2 of the second curved surface 228, as shown in FIG. 19. However, the first radius R1 of the first curved surface 118 may be different from the second radius R2 of the second curved surface 228 as shown in FIGS. 20 and 21, if necessary.

The first lens 100 and the second lens 200 may be aligned by being vertically (a Z-axis direction based on FIG. 18) joined to each other. In this state, the first primary flat surface 114 and the first secondary flat surface 224 may not contact each other, but the second primary flat surface 116 and the second secondary flat surface 226 may contact each other.

The optical axes of the first lens 100 and the second lens 200 may coincide with each other by the contact between the first curved surface 118 and the second curved surface 228. Here, the first curved surface 118 and the second curved surface 228 may have the radii R1 and R2 of the same length as shown in FIG. 19. However, the first radius R1 of the first curved surface 118 may be different from the second radius R2 of the second curved surface 228 as shown in FIGS. 20 and 21, if necessary.

Further, as shown in FIGS. 19 and 20, the first curved surface 118 may have a convex shape and the second curved surface 228 may have a concave shape. Alternatively, as shown in FIG. 21, both of the first curved surface 118 and the second curved surface 228 may have a convex shape.

However, the lenses of the lens module 10 as described above are naturally aligned by the contact between the first curved surface 118 and the second curved surface 228 regardless of whether the first vertical surface 160 and the second vertical surface 260 contact each other, such that the distance between the lenses 100 and 200 may be constantly maintained.

In addition, in the lens module 10 according to the embodiment of the present invention, the second primary flat surface 116 and the second secondary flat surface 226 contact each other at all times in the state in which the first lens 100 contacts the second lens 200 and therefore, the optical axis distance between the first lens 100 and the second lens 200 may be constantly maintained.

Meanwhile, although only the joining structure of the first lens 100 and the second lens 200 is described above, the joining structure of the second lens 200 and the third lens 300 and the joining structure of the third lens 300 and the fourth lens 400 may be the same as the joining structure of the first lens 100 and the second lens 200.

As set forth above, according to embodiments of the present invention, the optical axes of the lenses can be easily aligned.

While the present invention has been shown and described in connection with the embodiments, it will be apparent to those skilled in the art that modifications and variations can be made without departing from the spirit and scope of the invention as defined by the appended claims.

What is claimed is:
1. A lens module, comprising:
   a first lens including a first conical surface based on an optical axis and a first flat surface extending in a vertical direction with respect to the optical axis; and
   a second lens including a second conical surface based on an optical axis and a second flat surface extending in a vertical direction with respect to the optical axis,
   wherein the first conical surface and the first flat surface are connected by a first curved surface having a first radius, and
   the second conical surface and the second flat surface are connected by a second curved surface having a second radius,
   wherein the first radius and the second radius have the same length.

* * * * *